(12) United States Patent
Iwabuchi et al.

(10) Patent No.: US 7,377,483 B2
(45) Date of Patent: May 27, 2008

(54) DIAPHRAGM VALVE

(75) Inventors: Toshiaki Iwabuchi, Gunma (JP); Katsuhiko Honma, Gunma (JP)

(73) Assignee: Kitz SCT Corporation, Tokyo (JP)

( * ) Notice: Subject to any disclaimer, the term of this patent is extended or adjusted under 35 U.S.C. 154(b) by 0 days.

(21) Appl. No.: 11/208,539

(22) Filed: Aug. 23, 2005

(65) Prior Publication Data
US 2006/0060813 A1    Mar. 23, 2006

(30) Foreign Application Priority Data
Sep. 22, 2004    (JP)    .............................. 2004-274681

(51) Int. Cl.
*F16K 1/00* (2006.01)
*F16K 31/00* (2006.01)
(52) U.S. Cl. .................... 251/331; 251/335.2
(58) Field of Classification Search ................ 251/331, 251/335.2
See application file for complete search history.

(56) References Cited

U.S. PATENT DOCUMENTS 4,717,906 A * 1/1988 Smith ...................... 340/391.1
5,413,311 A * 5/1995 Arstein et al. .............. 251/331
5,743,513 A * 4/1998 Yoshikawa et al. ........ 251/335.2
5,851,004 A * 12/1998 Wu et al. ................... 251/331
6,736,370 B1 * 5/2004 Crockett et al. ............ 251/331
6,871,803 B1 * 3/2005 Ohmi et al. ................ 239/596

FOREIGN PATENT DOCUMENTS

JP        6-27551        4/1994
JP        2002-340203    11/2002

* cited by examiner

*Primary Examiner*—Ramesh Krishnamurthy
*Assistant Examiner*—Andrew J Rost
(74) *Attorney, Agent, or Firm*—Wenderoth, Lind & Ponack, L.L.P.

(57) ABSTRACT

A diaphragm valve for opening or closing itself through making direct contact of or through breaking the direct contract of a metal diaphragm with a valve seat disposed inside a body provided with an inlet port and an outlet port. The diaphragm valve includes an elevating member which serves to make or break the direct contact of the metal diaphragm with the valve seat and which is fusion-bonded to the metal diaphragm.

3 Claims, 5 Drawing Sheets

DIAPHRAGM VALVE

BACKGROUND OF THE INVENTION

1. Field of the Invention

This invention relates to a diaphragm valve of the so-called direct seal structure used in a gas feeding system for a process of fabricating semiconductors or a process of producing liquid crystals and is operated so as to open or close a fluid flow path by causing a valve body formed of a diaphragm to make or break direct contact with a valve seat.

2. Description of the Prior Art

A diaphragm valve that is provided in the interior thereof with a seal structure formed of a metallic diaphragm and metallic seat packing has been prevailing to date. This diaphragm valve 1, as illustrated in FIG. 4, forms a seal structure with a so-called domed diaphragm 2 having a swelled central part and seat packing 3, disposes a vertically movable diaphragm-depressing member 4 above the diaphragm 2, and enables the diaphragm 2 to be actuated by vertically moving the diaphragm-depressing member 4 with a stem 5. At the time of closing the valve, by rotating a handle 6, thereby moving the stem 5 downwardly and depressing the diaphragm-depressing member 4 in the direction of the diaphragm 2 as illustrated on the left side of the cross section, a polished surface 2a of this diaphragm 2 is enabled to seal the seat packing 3 and consequently block a flow path 7. When opening the valve, by rotating the handle 6 in the opposite direction to the direction used in closing the valve, thereby moving the stem 5 upwardly and raising the diaphragm-depressing member 4 upwardly, as illustrated on the right side of the cross section, the diaphragm 2 is caused by its elastic force to restore the domed shape thereof and the flow path 7 is opened. The surface of the diaphragm-depressing member 4 for depressing the diaphragm 2 is formed with an arcuate surface 4a. By the contact of this arcuate surface 4a, the diaphragm 2 is enabled to maintain the state from the time of closing the valve till the time of opening it. By the depression exerted by this arcuate surface 4a on the diaphragm 2, the seat packing 3 is enabled to effect the sealing more positively and keep the flow path 7 in the closed state.

Then, a diaphragm valve forming a diaphragm in an upwardly spherical shape, causing this diaphragm to form on the circumference slightly to the center an annularly projecting part of an arcuate cross section having the upper surface dented downwardly and the lower surface projected downwardly, forming a valve seat destined to be pressed by the leading terminal of the annular projecting part of the diaphragm in an annular shape having a flat upper surface, and hardening the upper surface of the annular valve seat by a treatment is also known (refer, for example, to JP-B HEI 6-27551).

A diaphragm valve having a diaphragm sealed and immobilized by causing an annular projection formed along the peripheral part of the diaphragm to be nipped on the outer peripheral side and the inner peripheral side thereof with the annular projection formed for retaining a main body or the diaphragm and an annular groove formed on the opposite side from the diaphragm at the position corresponding to the annular projection is further known (refer, for example, to JP-A 2002-340203).

Meanwhile, a diaphragm valve of a structure other than the direct seal structure resorting to a diaphragm that has a disc 12 disposed in a lower part than a diaphragm 11 and a sealing member 13 inserted in the lower part of this disc 12 as illustrated in FIG. 5 is known. This diaphragm valve 10 is enabled, by vertically moving a stem 14 as illustrated in the cross section, to bring the sealing member 13 into contact with a valve seat 15 and open or close a flow path 16.

The diaphragm valve 1 of the direct seal structure shown in FIG. 4, however, has the possibility that the operation of opening the valve will entail the phenomenon of causing the diaphragm 2 to be drawn toward the flow path 7 and resulting in decreasing the flow volume because it is adapted to retain the diaphragm 2 solely by virtue of the state of causing the diaphragm depressing member 4 to be kept in contact therewith. Particularly, when the diaphragm valve 1 happens to have a large diameter, the surface area of the diaphragm 2 exposed to the pressure of the fluid is proportionally increased. When the value of this large diameter is used in the state of vacuum, the load of negative pressure possibly causes the diaphragm 2 to sink as though it were copiously drawn in the direction of the seat packing 3 and induces the valve to be spontaneously closed besides decreasing the flow volume.

Further, since in the diaphragm valve 1, the diaphragm 2 is adapted to form the domed shape by dint of its restoring force during the operation of opening the valve, it is required to be attached to the diaphragm-depressing member 4 in such a manner as to ensure formation of the domed shape. The diaphragm 2 is attached as adjusted for enabling exclusively the neighborhood of a top part 4b to contact the diaphragm-depressing member 4 during the operation of opening the valve.

When the diaphragm-depressing member 4 is moved downward through the motion of the stem 5, the diaphragm 2 carries out a stroking motion while it is deformed along the arcuate surface 4a from the top part 4b of the diaphragm-depressing member 4. At this time, the stem stroke $L_1$ of the stem 5 in the vertical direction is converted to the valve stroke $L_2$ which is the distance from the position which the top part 4b assumes when the valve begins to open to the position at which the seat packing 3 is sealed and the stroke (not shown) in the vertical direction of the amount of deformation produced by the diaphragm 2 along the arcuate surface 4a. Consequently, the valve stroke $L_2$ of the diaphragm 2 to the seat packing 3 is shorter than the stem stroke $L_1$ of the stem 5. When the stem stroke $L_1$ of the stem 5 happens to be 1.8 mm in the diagram of FIG. 4, for example, the valve stroke $L_2$ of the diaphragm 2 measures 1.0 mm. The valve stroke $L_2$, therefore, is shorter than the stem stroke $L_1$.

Thus, the diaphragm valve 1 has not been efficient because the valve stroke $L_2$ acquired thereby is not equal in size to the stem stroke $L_1$ and the flow volume acquired thereby is small for the size of the stem stroke $L_1$. Further, the diaphragm valve 1 is required during the course of manufacture to have the stem stroke $L_1$ set in advance at a prescribed magnitude for the purpose of obtaining the same magnitude as the valve stroke $L_2$.

Further, an effort to increase the flow volume by forming the diaphragm valve 1 with a large diameter and enlarging the area for passing the fluid has resulted in suffering the amount of deformation of the diaphragm 2 relative to the arcuate surface 4a to increase further proportionately to the size of the area for passage in addition to entailing the aforementioned problem of the diaphragm 2 being drawn in the direction of the seat packing 3. As a result, the proportion of the valve stroke $L_2$ to the stem stroke $L_1$ is decreased and the proportion of the flow volume consequently obtained is decreased in accordance as the area for passing the fluid (seat diameter of the seat packing 3) is increased.

The diaphragm valve of JP-B HEI 6-27551 is aimed at increasing the Cv value which is the coefficient of flow volume by preventing the diaphragm from ruffling (furrowing) when the diaphragm is being sealed and by enlarging the stroke of the diaphragm, thereby widening the gap between the lower surface of the diaphragm and the upper surface of the annular valve seat during the operation of opening the valve. Since this diaphragm valve is not different from the countertype of FIG. 4 in possessing the structure of opening or closing the flow path by vertically moving the stem which is in the state of keeping contact with the upper side of the diaphragm in the domed shape, it cannot prevent the phenomenon of the diaphragm being drawn in the direction of the seat packing and cannot easily overcome the problem, such as the decrease of the flow volume.

As regards the diaphragm valve of JP-A 2002-340203, it is aimed at providing the diaphragm with a prescribed restoring force and consequently stabilizing the ability of the valve to open or close the flow path by having the inner and outer peripheral surfaces of the projection excluding the annular projection nipped and sealed through the diaphragm. The idea of causing the valve to assume an opened state by dint of the restoring force of the diaphragm, similarly to the invention of JP-B HEI 6-27551, falls short of preventing the decrease of the flow volume during the operation of opening the valve.

The diaphragm valve 10 which opens or closes the flow path by dint of the seal member 13 of the disc 12 as shown in FIG. 5 has the stroke of the stem 14 produce the valve stroke $L_3$ of the disc 12 and is allowed to increase the flow volume during the operation of opening the valve because this valve stroke $L_3$ can be increased. This structure of having the diaphragm 11 attached as nipped on the upper side of the disc 12 by helical attachment of the disc 12, however, induces the occurrence of a gap between the disc 12 and the diaphragm 11 and consequently entails the problem that the disc 12 and the diaphragm 11 will rub against each other and give rise to particles.

This invention has been initiated in view of the conventional problems and has for an object thereof the provision of a diaphragm valve of the direct seal structure capable of increasing the flow volume during the operation of opening the valve, namely a diaphragm valve that is capable of infallibly suppressing the generation of particles.

SUMMARY OF THE INVENTION

A first aspect of the present invention provides a diaphragm valve for opening or closing a fluid flow path by making direct contact or through breaking the direct contract of a metal diaphragm with a valve seat disposed inside a body provided with an inlet port and an outlet port. The diaphragm includes an elevating member which serves to make or break the direct contact of the metal diaphragm with the valve seat and which is fusion-bonded to the metal diaphragm.

In a second aspect that includes the first aspect of the invention, the metal diaphragm has a perforation approximately at a central position thereof and the metal diaphragm and the elevating member are welded together at the position of this perforation.

In a third aspect that includes the first aspect of the invention, the elevating member comprises a manually or automatically driven stem or a manually or automatically driven stem and a diaphragm piece interlocked with the stem.

In a fourth aspect that includes the first aspect of the invention, the metal diaphragm is a metal having a high degree of hardness including a Ni—Co alloy, and the valve seat is disposed integrally with or separately from the body and is a metal including SUS 316L having a lower degree of hardness than the metal diaphragm.

In a fifth aspect that includes the first aspect of the invention, the valve seat is a heat-resistant nonmetallic member of PTFE (polytetrafluoroethylene), PI (polyimide), PCTFE (polychlorotrifluoroethylene) or PFA (copolymer of tetrafluoroethylene and perfluoroalkoxyethylene) and the metal diaphragm is a metal including Ni—Co alloy, SUS, INCONEL and HASTELLOY.

In a sixth aspect that includes the third aspect of the invention, the stem has a depressing part at a lower end thereof, the depressing part or the diaphragm piece and the metal diaphragm are so disposed as to contact each other always at a sealing position of the valve seat.

In a seventh aspect that includes the first aspect of the invention, the valve seat is set in position at a level lower by a valve stroke than an outer peripheral part of a seal of the metal diaphragm.

In an eighth aspect that includes the seventh aspect of the invention, the valve seat is set in position at a level lower by about ½ of the valve stroke.

The first aspect of the invention provides a diaphragm valve that enables the flow volume during the operation of opening the valve to be increased because the metal diaphragm is not drawn in the direction of the flow path and because the stroke during the course of operation can be substantially equalized with the stroke of the metal diaphragm. The diaphragm valve further can infallibly suppress the generation of particles during the operation of the valve body and infallibly retain the prescribed flow volume during the course of service in a vacuum state without the possibility of blocking the valve body.

The second aspect of the invention concerns a diaphragm valve that is capable of enhancing the durability of the valve body because the central portion of the valve body is vertically moved so that the valve body may be displaced to positions above and below the position of the outer diameter of the seal during the course of the operation of the valve body. It is also capable of opening or closing the valve body infallibly and, at the same time, permitting the structure of infallibly operating the valve body to be easily disposed, and simplifying the valve interior owing to this internal structure. It is further capable of preventing the generation of particles more infallibly.

The third aspect of the invention provides a diaphragm valve that enables the valve body to be infallibly operated during either a manual operation or an automatic operation using an electric actuator and enables fine adjustment of the flow volume to be infallibly effected by directly operating the valve body.

The fourth aspect of the invention provides a diaphragm valve that is capable of retaining highly accurate adjustment of the flow volume through repeated opening and closing operations without the possibility of inflicting damage to the valve body. This diaphragm valve, even when the sealing property thereof is deteriorated, is still capable of permitting easy maintenance and retaining high sealing property constantly.

The fifth aspect of the invention provides a diaphragm valve that is capable of successfully handling even a fluid of high temperature and manifesting a high sealing property infallibly. This diaphragm valve is also capable of avoiding infliction of damage on the valve body.

The six aspect of the invention provides a diaphragm valve that is capable of allowing the stroke of the valve body to be increased and the flow volume to be increased and, while the fluid is flowing, enabling the flow volume to be retained at a fixed level constantly.

The seventh and eighth aspects of the invention provide a diaphragm valve that is capable of allowing the flow volume to be increased by widening the gap between the valve body and the surface of the valve seat during the operation of opening the valve and, during the course of the operation of closing the valve, maintaining the sealing property infallibly.

The above and other objects, characteristic features and advantages of the present invention will become apparent to those skilled in the art from the description given herein below with reference to the accompanying drawings.

DETAILED DESCRIPTION OF THE PREFERRED EMBODIMENT

One preferred embodiment of the diaphragm valve contemplated by this invention will be described below with reference to the accompanying drawings.

Figure 1:
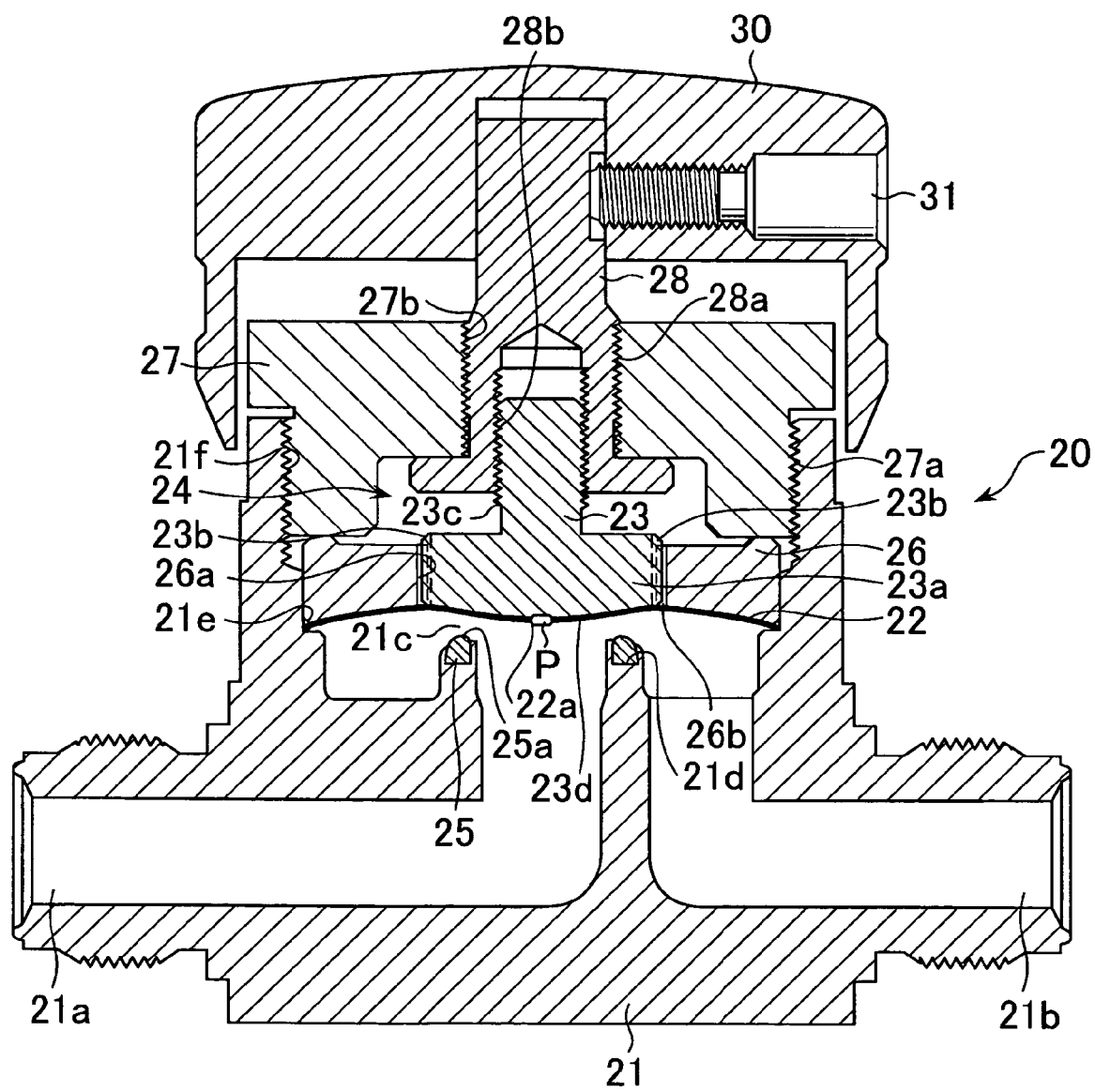
FIG. 1 is a halved cross section illustrating one embodiment of the diaphragm valve according to the present invention.
Figure 2:
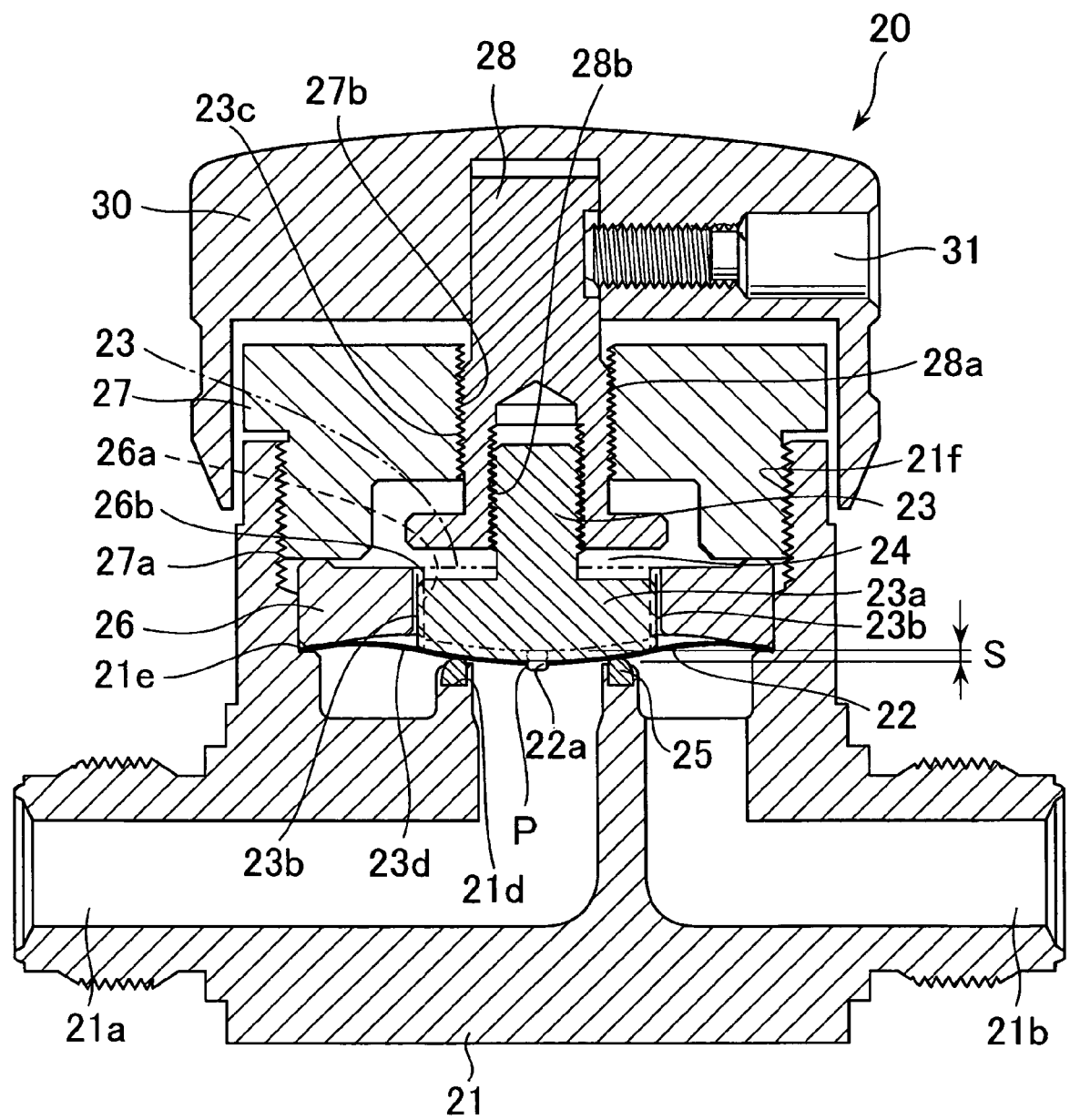
FIG. 2 is a halved cross section illustrating the diaphragm valve of FIG. 1 in a state of keeping the valve closed.
Figure 3:
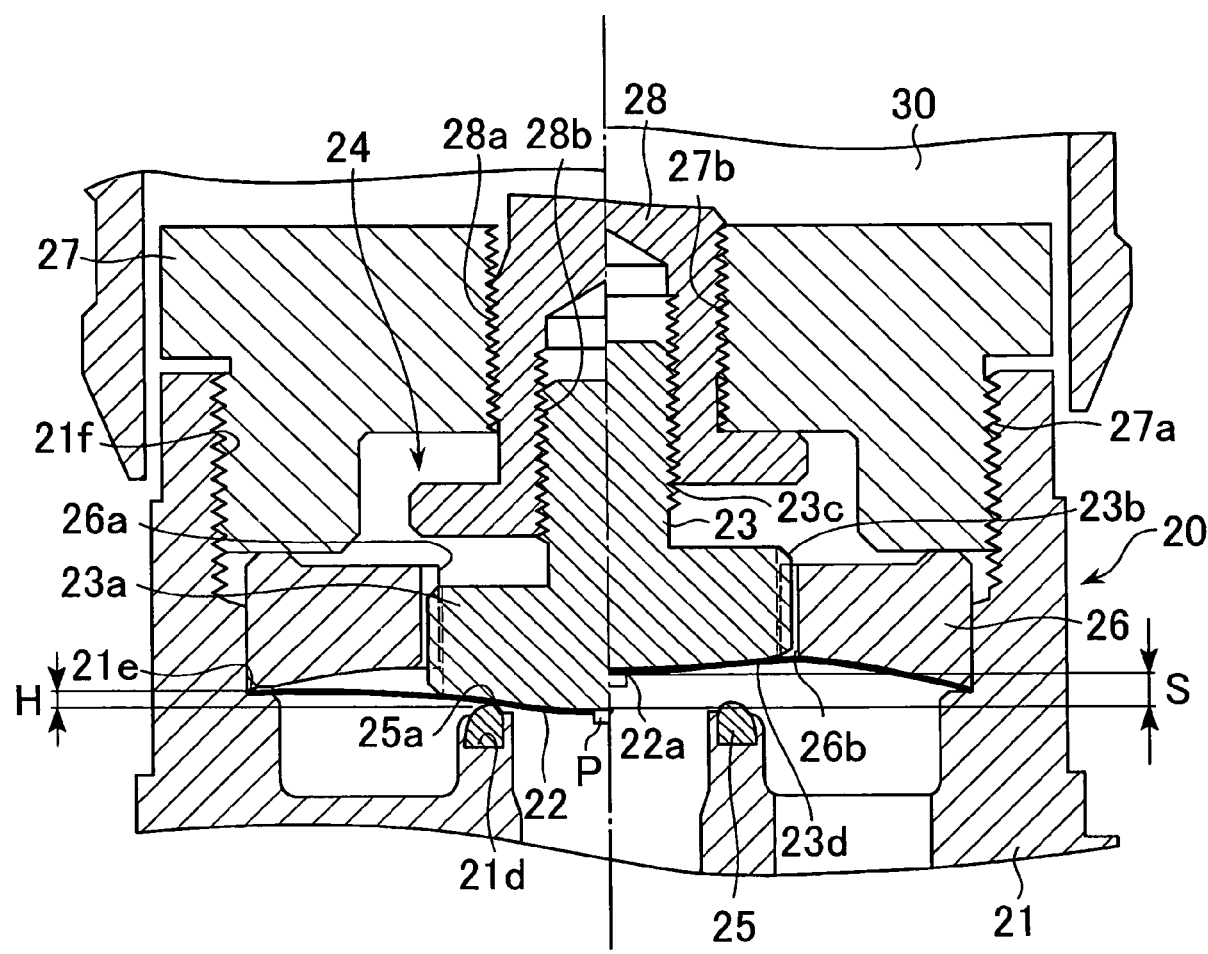
FIG. 3 is a partly magnified cross section illustrating the diaphragm valve of this invention in the states of opening and closing the valve.
Figure 4:
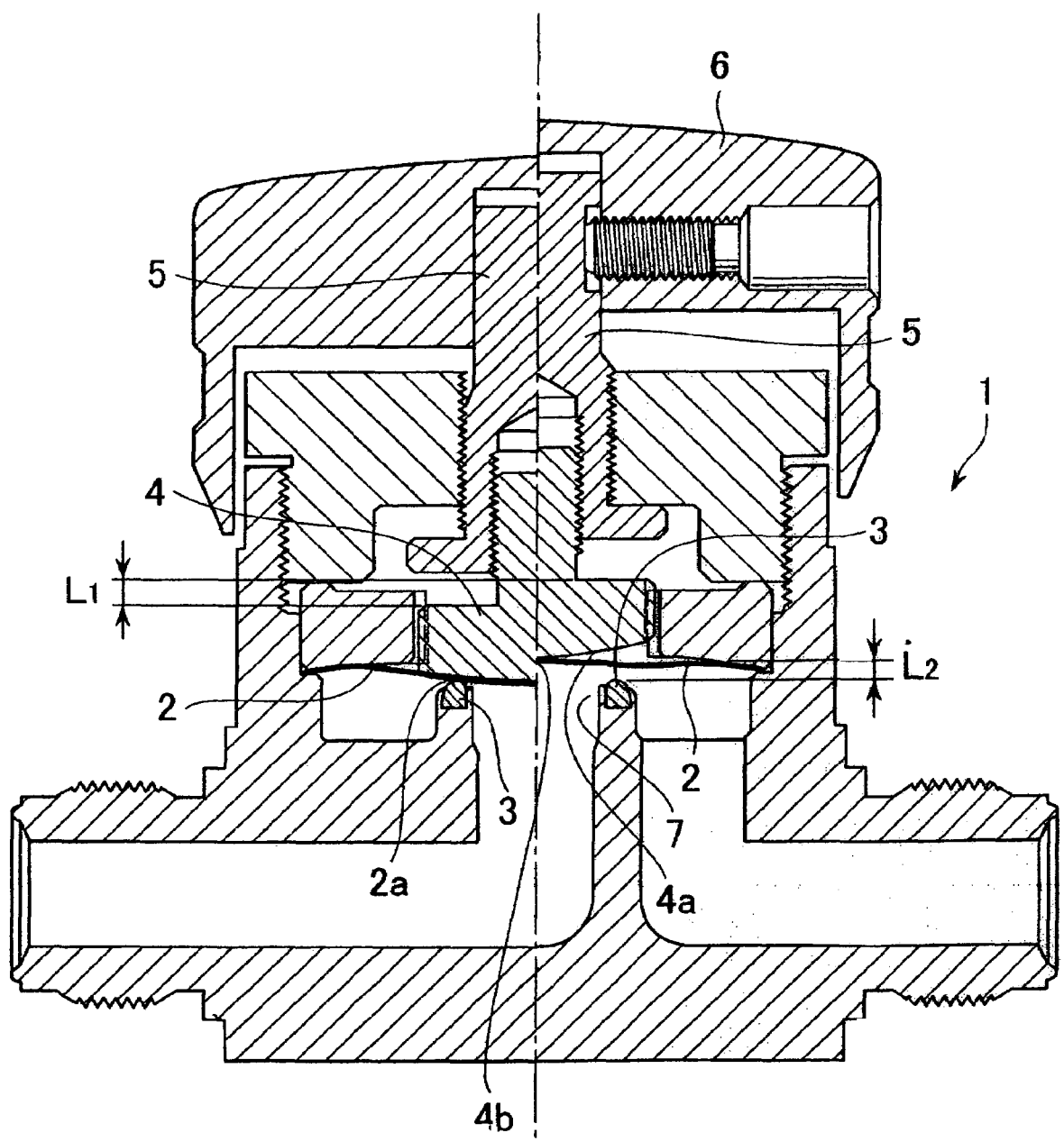
FIG. 4 is a halved cross section illustrating a conventional diaphragm valve.
Figure 5:
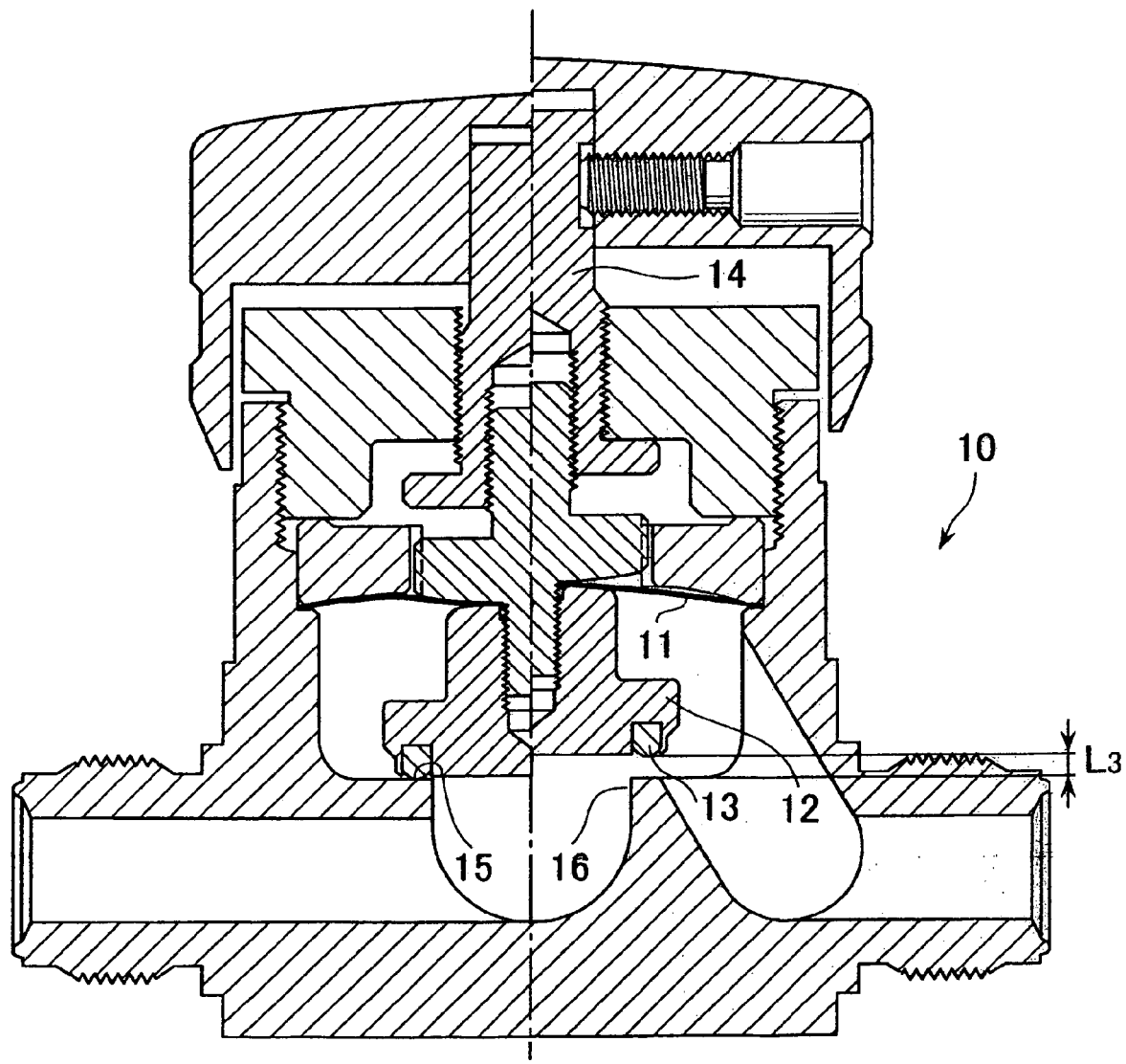
FIG. 5 is a halved cross section illustrating another conventional diaphragm valve.

A diaphragm valve main body 20 illustrated in FIG. 1 through FIG. 3 comprises as principal components a body 21, a metal diaphragm 22, an elevating member 24 and a valve seat 25. The valve has a structure such that it is opened or closed by causing the metal diaphragm 22 to directly contact the valve seat 25 disposed inside the body 21.

The body 21 is formed of a metal, such as stainless steel. Inside this body 21, a primary side approximately L-shaped inflow port 21a, a secondary side approximately L-shaped outflow port 21b, and a valve chamber 21c so formed as to pass along the upper sides thereof. Below the valve chamber 21c, a fitting groove 21d is formed.

The metal diaphragm 22 is formed, approximately in the shape of a dome, of an extremely hard metal, such as Ni—Co alloy, SUS, INCONEL and HASTELLOY or other such metallic material. The valve seat 25 is formed of a metal, such as SUS 316L having a lower hardness than the metal diaphragm 22 and disposed integrally with or separately from the body 21. This valve seat 25 may be made of a heat-resistant nonmetallic material, such as PTFE, PI, PCTFE or PFA.

The elevating member 24 comprises a manually or automatically driven stem 28 or a combination of such a stem 28 and a diaphragm piece 23 that is driven as interlocked with the stem 28. In the present embodiment, the diaphragm piece 23 is used as the elevating member 24 and the metal diaphragm 22 is welded to the diaphragm piece 23 so that the metal diaphragm 22 may be enabled by the diaphragm piece 23 to make or break contact with the valve seat 25. Specifically, the metal diaphragm 22 is provided approximately at the central position thereof with a through hole (perforation) 22a and the metal diaphragm 22 and the diaphragm piece 23 are integrally fusion-bonded by being welded with a welding part P at the position of this through hole 22a.

When the stem 28 is used as the elevating member 24, it suffices to form the stem 28 in a shape for opening or closing the metal diaphragm 22 and welding the metal diaphragm 22 directly to the stem 28. In any event, an unshown depressing part at the lower end of the stem 28 or the diaphragm piece 23 is so disposed as to contact the valve seat 25 always at the seal position. To be specific, the metal diaphragm 22 is adapted to assume a constantly deformed state at the plane of contact with an arcuate surface part 23d (FIG. 3) of the diaphragm piece 23 or an arcuate surface part formed on an unshown steam, no matter whether the valve is in an opened state or a closed state.

At the time of assembling the diaphragm valve main body 20, the metal diaphragm 22, which is welded to the diaphragm piece 23, has its peripheral edge portion mounted on a stepped part 21e formed inside the body 21 and a roughly annular diaphragm retainer 26 is mounted from above and immobilized thereon to have the metal diaphragm 22 inserted airtightly between the stepped part 21e and the retainer 26. In the diaphragm retainer 26, a depressing part 23a formed as radially diverged on the leading end side of the diaphragm piece 23 is fitted in so as to be inserted into an inserting hole 26a. At this time, the diaphragm piece 23 is fitted in a state prevented from rotating by causing more than one projecting parts 23b formed on the depressing part 23a of the diaphragm piece 23 to be loosely inserted into grooved parts 26b formed at the corresponding positions of the inserting hole 26a.

A cylindrical member 27 made of a metal is inserted from above so as to depress the diaphragm retainer 26 while a male thread 27a formed on the outer side thereof is managed to be helically attached to a female thread 21f formed at the corresponding position of the body 21, with the result that the metal diaphragm 22 will be nipped and immobilized between the diaphragm retainer 26 and the stepped part 21e. The stem 28 is fitted so as to attach helically a male thread 28a to a female thread 27b formed inside the cylindrical member 27. The stem 28 has a female thread 28b formed therein. A male thread 23c formed on the diaphragm piece 23 is helically attached to the female thread 28b.

The male thread 28a of the stem 28 and the female thread 27b of the cylindrical member 27, and the male thread 23c of the diaphragm piece 23 and the female thread 28b of the stem 28 are each formed by the combination of prescribed pitches to form a mechanism adapted to decrease the amount of motion of the diaphragm piece 23 relative to the amount of vertical motion of the stem 28 and enable the diaphragm piece to be vertically moved in a minute amount at a time.

A drive means 30, such as a manual handle, is fixed with a pin 31 on the stem 28 in a state of preventing rotation and it is so disposed that the rotation of this drive means 30 may rotate the stem 28 relative to the cylindrical member 27 and impart a vertical motion to the diaphragm piece 23. The drive means 30 may be any of various devices operated electrically, pneumatically and electromagnetically besides the manual handle.

When the drive means 30 is rotated from the state of FIG. 1 and consequently made to depress the diaphragm piece 23 toward the depressing part 23a, the metal diaphragm 22 is depressed by the diaphragm piece 23 toward of the valve seat 25 and the metal diaphragm 22 is made to collide against and seal the valve seat 25 as illustrated in FIG. 2, with the result that the fluid flowing inside the body 21 is blocked. The valve seat 25 is so adapted as to lower at this time the position of the valve seat 25 by less than the valve stroke S from the stepped part 21e which is the outer peripheral sealing part of the metal diaphragm 22. Further, the height H from the valve seat surface 25a to the stepped part 21e is set at approximately ½ of the stroke S and the position of the valve seat 25 is lowered by less than the valve stroke S as illustrated in FIG. 3. The height H may be properly varied with the diameter of the diaphragm piece 23 or the valve seat surface 25a and the ratio thereof to the stroke S may be also varied.

Now, the function of the embodiment in the diaphragm valve of this invention will be described below.

Since the diaphragm valve of this invention has the elevating member 24 for causing the metal diaphragm 22 to make or break contact with the valve seat 25 welded to the metal diaphragm 22, the metal diaphragm 22 can be forcibly set in motion when the device means 30 is operated to impart a vertical motion to the elevating member 24 (diaphragm piece 23). As a result, the metal diaphragm 22 is not drawn toward the inflow port 21a or the outflow port 21b during the operation of opening the valve and this metal diaphragm 22 is consequently enabled to retain the domed shape thereof intact and maintain the flow volume of the fluid infallibly without being spontaneously blocked.

Furthermore, since the stroke S of the diaphragm piece 23 equals the stroke of the metal diaphragm 22, the flow volume which conforms to this stroke S can be obtained as it is and, even when the flow volume is increased by forming the diaphragm valve in a large diameter, the flow volume can be efficiently retained relative to the stroke S. Since the metal diaphragm 22 and the diaphragm piece 23 are fixed, no component part generates friction or gives rise to particles.

This invention is ideal for diaphragm valves in the gas supply system and the gas discharge system in the process for fabricating semiconductors or the process for producing liquid crystals and it can be extensively applied to other various fields.

What is claimed is:

1. A diaphragm valve for opening or closing a fluid flow path, the diaphragm valve comprising:
    a metal body provided with a valve seat, an inlet port and an outlet port;
    a metal diaphragm;
    a manually or automatically operated stem helically attached inside the metal body so as to be movable up and down so as to cause the metal diaphragm to make or break contact with the valve seat; and
    a diaphragm piece helically attached to a lower portion of the stem so as to be movable up and down due to being interlocked with the stem, said diaphragm piece being provided at a lower end thereof with a radially diverged depressing part, being fusion-bonded by welding integrally to the metal diaphragm at a position of a through perforation formed approximately at a central position of the metal diaphragm, and being provided on a lower surface thereof with an arcuate surface part that is always kept in contact with the metal diaphragm at a sealing position of the valve seat and at a time of opening or closing the fluid flow path,
    the metal diaphragm having a peripheral edge portion mounted on a stepped part formed inside the metal body and having an upper part of the peripheral edge portion immobilized with a diaphragm retainer such that the metal diaphragm is inserted airtightly between the stepped part and the diaphragm retainer,
    the valve seat having a valve seat surface disposed at a position below the stepped part, and a distance between the valve seat surface and the stepped part being set to be ½ of a valve stroke,
    wherein a portion of the metal diaphragm is displaced toward an upper side of the peripheral edge portion of the metal diaphragm and a portion is displaced toward a lower side of the valve seat surface in both an open state and closed state of the valve.

2. A diaphragm valve according to claim 1, wherein the metal diaphragm is formed of Ni—Co alloy having a given degree of hardness and the valve seat is formed of a metal having a degree of hardness lower than that of the metal diaphragm.

3. A diaphragm valve comprising:
    a metal valve body defining an inlet port, an outlet port, and a fluid flow path extending therebetween;
    a valve seat disposed in the metal valve body;
    a metal diaphragm having a central through hole and an outer peripheral portion mounted to the valve body for closing the fluid flow path by making direct contact with the valve seat, wherein the metal diaphragm includes a central convex portion that projects toward the valve seat and an annular convex portion that projects away from the valve seat in both an open state of the valve and in a closed state of the valve;
    a valve stem movable toward and away from said metal diaphragm so as to cause the metal diaphragm to make or break contact with said metal valve seat; and
    a diaphragm piece threadedly connected to the valve stem, wherein said metal diaphragm is fusion-bonded to said diaphragm piece by welding at a position of the central through hole, and said diaphragm piece has an arcuate surface part that is always kept in contact with the metal diaphragm in the open state of the valve and in the closed state of the valve, and
    wherein said valve seat is positioned at a level that is lower than the outer peripheral portion of said metal diaphragm, and the distance between the valve seat surface and the stepped part is set to be ½ of a valve stroke.

* * * * *